United States Patent [19]

Hirata

[11] Patent Number: 4,572,457
[45] Date of Patent: Feb. 25, 1986

[54] EMERGENCY LOCK RETRACTOR

[75] Inventor: Kazumi Hirata, Fujisawa, Japan

[73] Assignee: NSK-Warner K.K., Japan

[21] Appl. No.: 689,771

[22] Filed: Jan. 8, 1985

[30] Foreign Application Priority Data

Jan. 19, 1984 [JP] Japan ............................... 59-4612[U]

[51] Int. Cl.[4] ...................... A62B 35/02; B65H 75/48
[52] U.S. Cl. ..................... 242/107.4 A; 242/107.4 B
[58] Field of Search ................ 242/107.4 A, 107.4 B; 280/806; 297/478

[56] References Cited

U.S. PATENT DOCUMENTS

| | | | |
|---|---|---|---|
| 3,851,835 | 12/1974 | Fohl | 242/107.4 |
| 3,944,164 | 3/1976 | Tibbe | 242/107.4 A |
| 4,077,585 | 3/1978 | Wiesboeck | 242/107.4 B |
| 4,278,216 | 7/1981 | Takada | 242/107.4 B |
| 4,392,620 | 7/1983 | Takada | 242/107.4 A |
| 4,393,995 | 7/1983 | Tukamoto | 242/107.4 A |
| 4,485,986 | 12/1984 | Sugimoto | 242/107.4 B X |

FOREIGN PATENT DOCUMENTS

| | | |
|---|---|---|
| 2511503 | 9/1976 | Fed. Rep. of Germany . |
| 2113979 | 8/1983 | United Kingdom . |

*Primary Examiner*—John M. Jillions
*Attorney, Agent, or Firm*—Cantor and Lessler

[57] ABSTRACT

An emergency lock retractor is equipped with locking means to be actuated in the event of emergency. The locking means includes stationary locking teeth, an interlocking member provided displaceable between a first position where the interlocking member is out of engagement with the locking teeth and an second position where the interlocking member is brought into engagement with the locking teeth and take-up spindle so as to restrain any further rotation of the take-up spindle, a spring member adapted normally to cause the interlocking member to rotate together with the take-up spindle and to bias the interlocking member toward the first position while holding the interlocking member out of engagement with the take-up spindle, a locking member for causing the interlocking member to shift from the first position to the second position; and means permitting the rotation of the locking member in association with the take-up spindle in the event of emergency. Owing to the provision of the means permitting forced rotation of the take-up spindle in the event of emergency, all the parts are kept free from undue loads.

4 Claims, 13 Drawing Figures

EMERGENCY LOCK RETRACTOR

BACKGROUND OF THE INVENTION (1) Field of the Invention

This invention relates to an emergency lock retractor suitable for use in a vehicle or the like.

(2) Description of the Prior Art

A number of retractors have been proposed to date. These conventional retractors have however not met full satisfaction for one or more reasons. Some of such conventional retractors have complex structures and hence require high manufacturing costs. Certain conventional retractors lack speed in operation from the detection of changes in vehicle speed, webbing releasing speed or the like until the locking of their corresponding webbings and hence result in intolerably excessive release of the webbings. In some other examples of such conventional retractors, dimensional errors of their parts may occur in the same directions due to their complex structures. Under such situations, there is a danger that certain parts may be subjected to undue forces and in some instances, may eventually be broken before the rotation of their corresponding take-up spindles are fully restrained.

SUMMARY OF THE INVENTION

An object of this invention is to provide an emergency lock retractor free of the above-mentioned problems of the conventional emergency lock retractors.

In one aspect of this invention, there is thus provided an emergency lock retractor equipped with a base, a take-up spindle supported rotatably on the base and holding a take-up reel, on which a webbing is wound, fit fixedly thereon, means for biasing the take-up spindle in the webbing winding direction, and locking means actuated in the event of emergency to prevent the take-up spindle from rotating in the webbing releasing direction, which locking means comprises:

(a) locking teeth arranged on the base of the retractor;

(b) an interlocking member provided between the take-up spindle and the locking teeth and displaceable between a first position where the interlocking member is out of engagement with the locking teeth and a second position where the interlocking member is brought into engagement with the locking teeth and take-up spindle so as to restrain any further rotation of the take-up spindle;

(c) a spring member engageable at one portion thereof with the take-up spindle and at another portion thereof with the interlocking member, thereby normally causing the interlocking member to rotate together with the take-up spindle and biasing the interlocking member toward the first position while holding the interlocking member out of engagement with the take-up spindle;

(d) a locking member rotatable together with the take-up spindle subsequent to relative rotation of the take-up spindle in the event of emergency, thereby causing the interlocking member to shift from the first position to the second position; and (e) means permitting the rotation of the locking member in association with the take-up spindle in the event of emergency.

The emergency lock retractor of this invention requires fewer parts and hence has a simpler structure, while enjoying fail-free locking operation in the event of emergency and also featuring a shorter time lag from the detection of a change in inertia force until the completion of the locking operation. Owing to the provision of the means permitting forced rotation of the take-up spindle in the event of emergency, all the parts are kept free from undue loads.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENT

Figure 1:
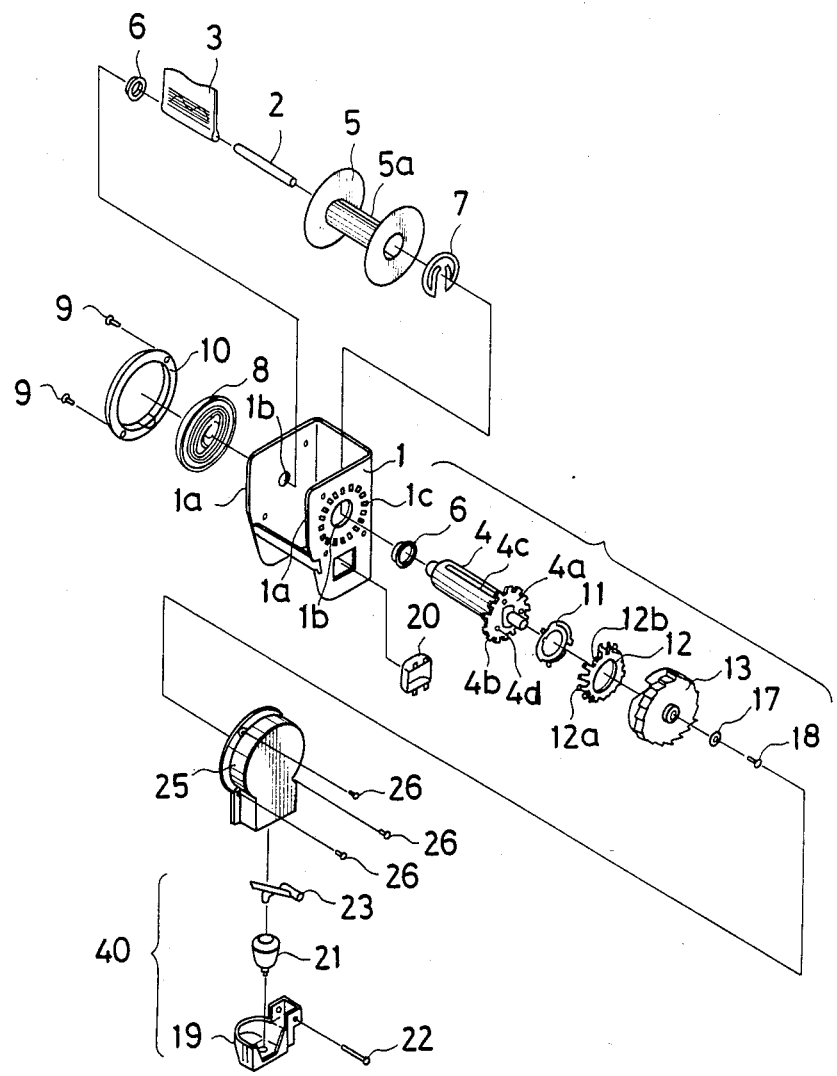
FIG. 1 is an exploded perspective view of an emergency lock retractor according to one embodiment of this invention.

Referring first to FIG. 1, a base 1 has a square U-shaped transverse cross-section along the majority of its height and includes a pair of opposing side plates 1a,1a. Through-holes 1b,1b are formed respectively through the side plates 1a,1a. Between the through-holes 1b,1b, a take-up spindle 4 carrying a take-up reel 5 mounted fixedly thereon is rotatably supported by way of left and right bearings 6 and a retainer ring 7. One end of a webbing 3 is inserted through one of slits 5a (the upper slit is solely seen in the figure) formed through the take-up reel 5 into a through-slot 4c of the take-up spindle 4. Underneath the take-up spindle 4, a slip-off preventing pin 2 is caused to extend through a loop formed at the one end of the webbing 3. Making use of the slip-off preventing pin 2, the webbing 3 is fastened to the take-up spindle 4. The inner end of a take-up spring 8 is hooked on one end of the take-up spindle 4, while the outer end of the take-up spring 8 is hooked on the inner wall of a cover 10 mounted fixedly on the side plate 1a of the base 1 by means of fasteners 9 such as self-tapping screws or the like. By the take-up spring 8, the take-up spindle 4 is normally biased in the winding direction of the webbing 3.

On the other hand, locking means 30 is arranged on the other end of the take-up spindle 4 in order to restrain release of the webbing in the event of emergency. The locking means 30 is composed, in order outwardly from the take-up spindle 4, of locking teeth 1c, cog wheel 4a, latch-up spring 11, latch ring 12 and ratchet wheel 13.

The plurality of locking teeth 1c (18 locking teeth in the illustrated embodiment) are arranged radially on the side plate 1a of the base 1, with an equal angular interval around the through-hole 1b through which the take-up spindle 4 extends. The locking teeth 1c may be provided by lancing the side plate 1a of the base 1. Alternatively, they may be formed by uniting a discrete part, which has been fabricated separately and includes the locking teeth, to the side plate 1a of the base 1.

The cog wheel 4a is fixedly mounted on the take-up spindle 4 and is assembled externally of, and adjacent to, the side plate 1a of the base 1. The cog wheel 4a is thus allowed to rotate integrally with take-up spindle 4. A plurality of cogs 4b (18 cogs in the illustrated embodiment) are formed on the circumference of the cog wheel 4a, corresponding to the locking teeth 1c.

Figure 2:
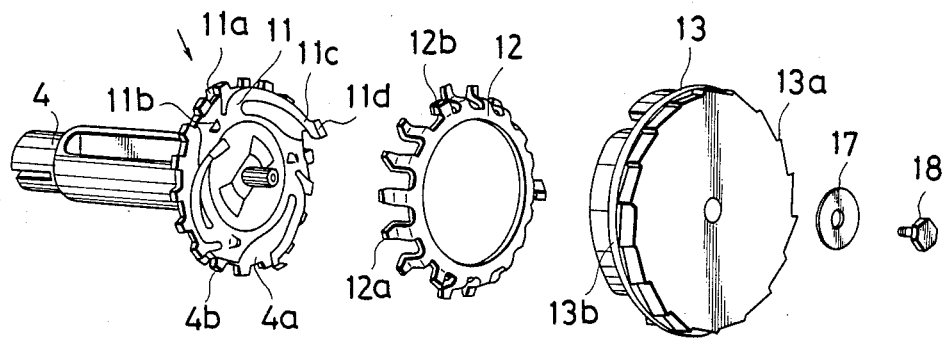
FIG. 2 is an exploded perspective view of locking means of the retractor illustrated in FIG. 1.
Figure 3:
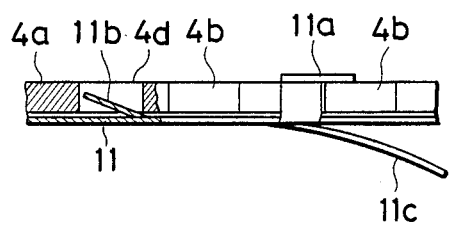
FIG. 3 is a fragmentary cross-sectional view seen in a direction indicated by an arrow in FIG. 2, showing the manner of engagement between a cog wheel and a latch-up spring.

As shown in FIG. 2, the latch-up spring 11 which is a spring member is equipped with a plurality of fingers 11a (3 fingers in the illustrated embodiment) adapted to engage the cogs 4b of the cog wheel 4a, anti-reversal stoppers 11b for holding the engagement between the fingers 11a and the cogs 4b, and a plurality of arms 11c (three arms in the illustrated embodiment) extending from and then along the circumference of the latch-up spring 11 toward the latch ring 12, which will be described herein, and having bent tip portions 11d at the free ends thereof. The latch-up spring 11 is interlocked with and is hence held by the cog wheel 4a in the following manner. The fingers 11a of the latch-up spring 11 are inserted between desired cogs 4 of the cog wheel 4a. Then, the latch-up spring 11 is turned clockwise, as seen in FIG. 2, until the anti-reversal stoppers 11b enter respectively the holes 4d formed in the cog wheel 4a. At this time, the fingers 11a are brought into engagement with the corresponding cogs 4b, thereby to hold the latch-up spring 11 as a unitary member on the cog wheel 4a. Therefore, the latch-up spring 11 rotates together with the cog wheel 4a whenever the take-up spindle 4 rotates.

Outside the latch-up spring 11, the latch ring 12 is arranged as an interlocking member which is brought into engagement with the locking teeth 1c. The latch ring 12 is composed of a ring-shaped main body, a plurality of teeth 12a (15 teeth in the illustrated embodiment) and a plurality of interlocking pieces 12b (3 interlocking pieces in the illustrated embodiment), both extending out from the circumference of the main body. Each of the teeth 12a extends first from the circumference of the main body toward its corresponding cog 4b of the cog wheel 4a. Its free end portion is tapered, and is bent radially and outwardly so as to extend in parallel to the confronting side plate 1a of the base 1. The intervals of the teeth 12a are set somewhat wider at some parts (at 3 locations in the illustrated embodiment) compared with the remaining parts so that the bent tip portions 11d of the arms 11c of the latch-up spring 11 can be received there (see, FIG. 4). The latch ring 12 is normally biased outwardly by the arms 11c of the latch-up spring 11 and its teeth 12a assume first positions where they are out of engagement with the locking teeth 1c and cogs 4b. When the teeth 12a assume, on the other hand, second positions where they are in engagment with the locking teeth 1c and cogs 4b, the teeth 12a extend through spaces between their corresponding cogs 4b and are brought into contact with the confronting side plate 1a of the base 1. Hence, the side walls of the teeth 12a are brought into contact with the locking teeth 1c and cogs 4b. As mentioned above, the latch-up spring 11 held as a unitary member on the cog wheel 4a serves to guide the latch ring 12 without causing it to contact with the cog wheel 4a when the latch ring 12 moves from the first position, where it is out of engagement with the locking teeth 1c, in a direction approaching the confronting side plate 1a of the base 1, because the arms 11c and bent tip portions 11d are held in place between the teeth 12a.

Three interlocking pieces 12b are arranged in total, each between a group of five teeth of the teeth 12a and its adjacent group of other five teeth of the teeth 12a. Each of the interlocking pieces 12b has a portion extending radially and outwardly from the circumference of the ring-shaped main body of the latch ring 12 and another portion extending aslant from a side surface of the former portion toward the cog wheel 4a. The interlocking pieces 12b make up a cam member in association with a portion of the ratchet wheel 13 disposed as a locking member at a position outside the latch ring 12. Thus, when the interlocking pieces 12b move slidingly over the cam surface of the ratchet wheel 13, the latch ring 12 is caused to move from the first position to an intermediate position where it is in contact with the confronting side plate 1a of the base 1. At this intermediate position, the teeth 12a of the latch ring 12 are located between the cogs 4a and the teeth 12a of the latch ring 12 confront the locking teeth 1c, thereby making the latch ring 12 engageable with the cog wheel 4a and the confronting side plate 1a.

Figure 5:
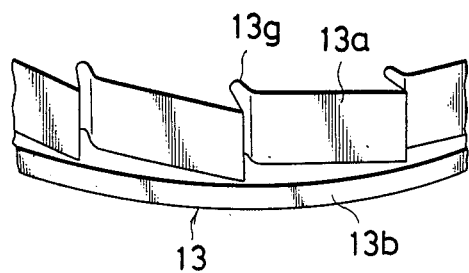
FIG. 5 is a fragmentary perspective view of a ratchet wheel, showing its teeth and skirt.
Figure 6:
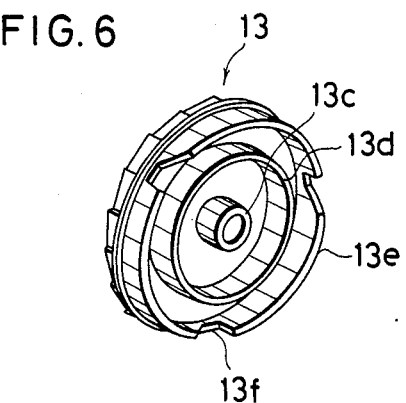
FIG. 6 is a perspective view showing the rear side of the ratchet wheel.

The ratchet wheel 13 has an approximately flattened-cylindrical shape and is loose-fit on the take-up spindle 4 at a location outside the latch ring 12. Outside the ratchet wheel 13, a stopper plate 17 is fixed on the take-up spindle 4 by means of a self-tapping screw 18 so as to hold the ratchet wheel 13 on the take-up spindle 4. On the outer circumference of the ratchet wheel 13, there are provided a plurality of teeth 13a (18 teeth in the illustrated embodiment). Namely, the number of the teeth 13a is equal to the number of the locking teeth 1c. It is however not essential to have the same number of teeth 12a as the locking teeth 1c. It is only necessary to provide an integer multiple of the locking teeth 1c in relation to the number of the teeth 13a. Since the ratchet wheel 13 may be produced by molding a resin, it is possible to produce the ratchet wheel 13 with a complex shape and a light weight and at a low manufacturing cost. On the other hand, there is a danger that such a resin-made ratchet wheel may be broken or cracked by undue stresses. As illustrated in FIG. 5, a disc-shaped reinforcing skirt 13b is therefore provided axially inside the teeth 13a. In addition, each tooth 13a is chamfered at a root portion 13g thereof. These skirts 13b and chamfered root portions 13g are effective in avoiding the abovedescribed breakage or cracks. On the other hand, as shown in FIG. 6, three cylindrical walls 13c, 13d, 13e are concentrically provided on the inner wall of the ratchet wheel 13, which inner wall confronts the latch ring 12. The cylindrical walls 13c, 13d, 13e are arranged in order radially from the center to the circumference of the ratchet wheel 13. These cylindrical walls 13c, 13d, 13e give reinforcement to the ratchet wheel 13. At the same time, the innermost cylindrical wall 13c is fit in the take-up spindle 4, thereby making up a rotary shaft for the ratchet wheel 13. The latch ring 12 is fit on the intermediate cylindrical wall 13d. Thus, the intermediate cylindrical wall 13d serves as a guide surface whenever the latch ring 12 moves. Furthermore, the outermost cylindrical wall 13e defines a plurality of notches 13f, corresponding to the interlocking pieces 12b of the latch ring 12. The notches 13f include tilted edges corresponding to the slanted portions of the interlocking pieces 12b. Normally, the interlocking pieces 12b extend to the very ends of the notches 13f with their slanted portions being kept in contact with the tilted edges of the notches 13f. Here, the latch ring 12 is biased toward the ratchet wheel 13 by the arms 11c of the latch-up spring 11 as described above. Its teeth 12a are held at the first positions where they are not engageable with the locking teeth 1c and cogs 4b.

A cover 25 is fixedly mounted on the side wall 1a of the base 1 by self-tapping attachment screws 26, thereby enclosing the locking means 30 therein.

Underneath the locking means 30, there is arranged inertia sensing means 40 which are composed of a support 19, a weight 21 and a ratchet lever 23. The support 19 attached to the cover 25 and the weight 21 placed in a cavity of the support 19 are respectively of the conventionally-known types.

The ratchet lever 23 includes a lever base 23a, a pawl 23b extending out perpendicularly from the lever base 23a, and a projection 23c extending downwardly from the longitudinal midpoint of the pawl 23b. The lever base 23a is supported pivotally by a support pin 22 on the support 19. In this assembled state, the projection 23c rests on a recess 21a formed in the upper surface of the weight 21. The pawl 23b extends from the lever base 23a toward the nearest teeth 13a of the ratchet wheel 13. Normally, the pawl 23b is held out of engagement with any of the teeth 13a of the ratchet wheel 13. The ratchet lever 23 is formed of a flexible material such as resin, spring material or the like.

The operation of the retractor of this invention, which has the aforementioned structure, will next be described.

Figure 7:
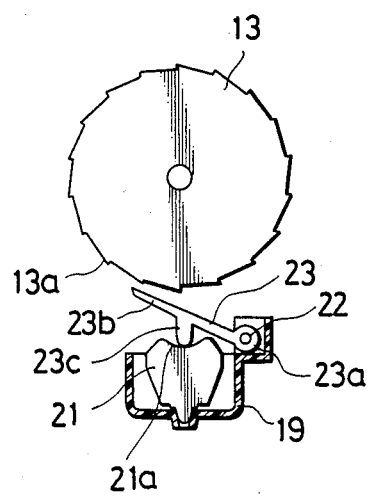
FIG. 7 is a schematic illustration showing the relationship between inertia sensing means and the ratchet wheel.
Figure 8:
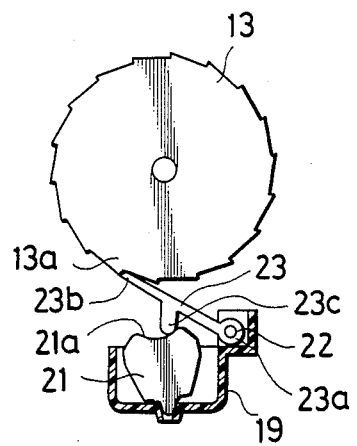
FIG. 8 is another schematic illustration showing the ratchet wheel in its locked state as a result of an actuation of the inertia sensing means.

Normally, the weight 21 of the inertia sensing means 40 takes the upright position as shown in FIG. 7. The ratchet lever 23 is therefore located below the ratchet wheel 13 and the pawl 23b and the teeth 13a of the ratchet wheel 13 are thus kept out of engagement, thereby allowing the ratchet wheel 13 to rotate freely.

Figure 4:
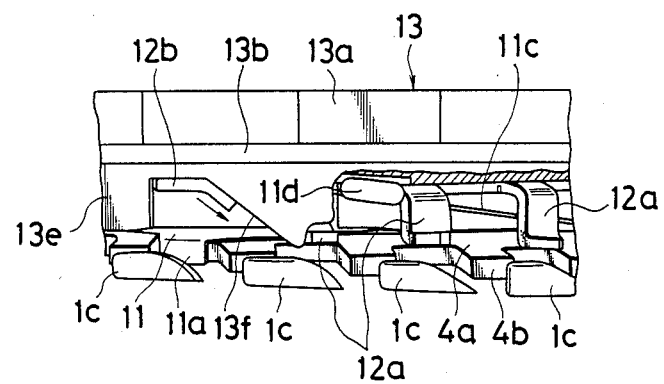
FIG. 4 is a fragmentary side view of locking means, depicting relationship among various components of the locking means upon actuation thereof.

At this time, the locking means 30 is in the state shown in FIG. 4. Namely, the latch ring 12 is biased by the biasing forces of the arms 11c of the latch-up spring 11 toward the ratchet wheel 13 and is thus kept unlocked (namely, held at the first position). Since the cog wheel 4a and latch ring 12 are interlocked by way of the latch-up spring 11 and the latch ring 12 and ratchet wheel 13 are interlocked by the cam means as mentioned above, these constituent members of the locking means are allowed to rotate together with the take-up spindle 4 whenever the webbing 3 is pulled out or taken up.

When the vehicle is subjected to a speed change beyond a predetermined level in the event of emergency, the weight 21 is tilted and the projection 23c, which rests in the recess 21a of the weight 21, is kicked up. Thus, the pawl 23b is swung about the lever base 23a toward the teeth 13a of the ratchet wheel 13. Owing to this swinging motion, the pawl 23b of the ratchet lever 23 is brought into engagement with one of the teeth 13a provided on the circumference of the ratchet wheel 13 to prevent the ratchet wheel 13 from rotating in the webbing releasing direction.

Even after the restraint of any further rotation of the ratchet wheel 13, the cog wheel 4a, latch-up spring 11 and latch ring 12 are still allowed to rotate as unitary members together with the take-up spindle 4 if the webbing 3 is pulled out further. Thus, the latch ring 12 which is rotating as a unitary member with the cog wheel 4a via the latch-up spring 11 is displaced in the winding releasing direction relative to the ratchet wheel 13. Accordingly, the interlocking pieces 12b of the latch ring 12 slide on the tilted edges of the corresponding notches 13f, which tilted edges are cam surfaces provided with the ratchet wheel 13, in the direction shown by an arrow in FIG. 4, thereby causing the latch ring 12 to move against the biasing force of the latch-up spring 11 toward the base 1 (the first position).

Figure 9:
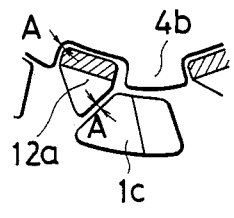
FIG. 9 is a further schematic illustration showing the positional relationship among locking teeth arranged on the base, cogs of the cog wheel and teeth of a latch ring when the teeth of the latch ring has reached the base.

FIG. 9 illustrates relative positions of a cog 4b of the cog wheel 4a, a tooth 12a of the latch ring 12 and a locking tooth 1c on the side plate 1a of the base 1 when the interlocking pieces 12b of the latch ring 12 have moved along their corresponding tilted edges of the ratchet wheel 13 and the teeth 12a of the latch ring 12 have reached the associated side plate 1a of the base 1 (namely, have assumed the intermediate positions). A clearance A is left between the locking tooth 1c and tooth 12a and between the tooth 12a and cog 4. Therefore, the rotation of the take-up spindle has not yet been restrained in this state.

When the take-up spindle 4 is turned further, the cog wheel 4a is also turned toward the upper right corner as seen in FIG. 9. Owing to deformation of the latch-up spring 11, the clearance A between the tooth 12a and cog 4a is narrowed down. The cog 4b is eventually brought into contact with the tooth 12a. Thereafter, the cog 4b forcingly pushes the tooth 12a toward the locking tooth 1c. Alternatively, it is also possible, by enhancing the rigidity of the latch-up spring 11, first to bring the tooth 12a of the latch ring 12 into contact with the locking tooth 1c and then to cause the cog 4b to contact with the tooth 12a.

In the above-mentioned state, the latch ring 12 is in contact with the associated side plate 1a of the base 1. Thus, the motion of the latch ring 12 relative to the ratchet wheel 13 cannot be converted to any motion along the axis of the take-up spindle 4. As a result, the ratchet wheel 13 is also forcedly turned together with the latch ring 12.

Figure 10:
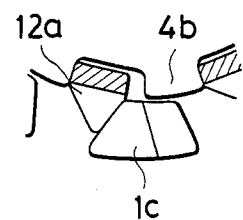
FIG. 10 depicts the latch ring forcedly pressed by the cog wheel against the locking teeth owing to further rotation of the take-up spindle subsequent to the state shown in FIG. 9.

When the locking tooth 1c, tooth 12a and cog 4b have been brought into mutual engagement (the second positions) as illustrated in FIG. 10, the cog wheel 4a and latch ring 12 are restrained from rotation and the take-up spindle 4 on which the cog wheel 4a is fixedly mounted is also restrained from rotation. Thus, the webbing 3 is restrained from any further release.

By the forced rotation of the latch ring 12 (the change from the state shown in FIG. 9 to that depicted in FIG.

Figure 11:
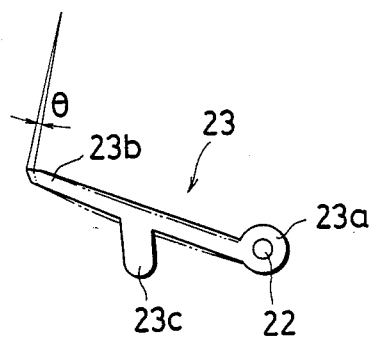
FIG. 11 shows the manner of bending of a ratchet lever in the state depicted in FIG. 10.

10) by the cogs 4b of the cog wheel 4a, the ratchet wheel 13 is forcedly turned together with the latch ring 12 over a small angle θ (see, FIG. 11) by the interlocking pieces 12b of the latch ring 12. Here, the ratchet wheel 13 pushes the ratchet lever 23, which is in engagement with one of the teeth 13a of the ratchet wheel 13, toward the lever base 23a. This small angular displacement of the ratchet wheel 13 is however absorbed through bending deformation of the pawl 23b because the pawl 23b has flexibility. Since the ratchet wheel 13 has the reinforced structure as mentioned above, it does not develop cracks or the like. Furthermore, owing to the bending of the pawl 23b, no substantial force is applied to a portion where the ratchet lever 23 is supported.

Figure 12:
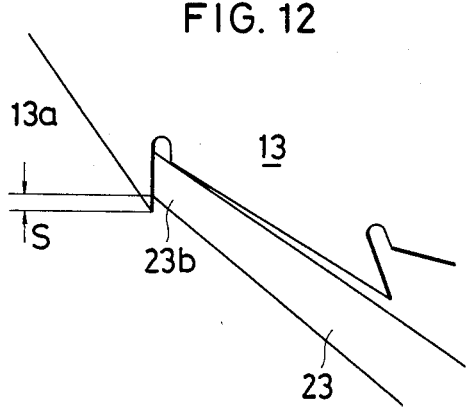
FIG. 12 is an enlarged fragmentary view of the ratchet wheel locked by the ratchet lever as shown in FIG. 8.
Figure 13:
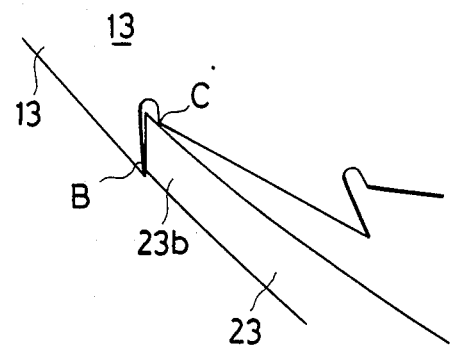
FIG. 13 is similar to FIG. 12 and shows the ratchet lever bent from its state shown in FIG. 12.

When the ratchet wheel 13 and ratchet lever 23 are in engagement, the tooth 13a and pawl 23b assume such relative positions as shown in FIG. 12. Namely, the contacting surfaces of the tooth 13a and pawl 23b are set in such a way that the tip of the tooth 13a extends by a distance S from the lower extremity of the pawl 23b. So long as the above positional relationship is met, the tooth 13a of the ratchet wheel 13 and the pawl 23b of the ratchet lever 23 are, as shown in FIG. 13, brought into mutual contact at two points B and C when the ratchet lever 23 is bent. Therefore, the tips of the teeth 13a and pawl 23b will not be damaged.

When the vehicle has returned from the emergency state to the normal state, the weight 21 of the inertia sensing means 40 restores its original position (i.e., the upright position) and the engagement between one of the teeth 13a of the ratchet wheel 13 and the pawl 23b is released. This disengagement of the pawl 23b permits rotation of the ratchet wheel 13, thereby causing the latch ring 12 to be pushed back toward the ratchet wheel 13 (the first position) while being guided by the arms 11c of the latch-up spring 11. Thus, the locking of the take-up spindle 4 is released.

Although the above embodiment makes use of the inertia sensing means of the type that the swinging motion of the upright weight is sensed as the swinging motion of the ratchet lever, it is also possible to use inertia sensing means of other types, for example, inertia sensing means of such types that speed changes of vehicles are sensed by weights of the pendulum or ball type or by degrees of rolling of inertia balls which roll on inverted conical surfaces.

Alternatively, it may also be possible to use inertia sensing means capable of sensing changes in releasing speed of a webbing instead of inertia sensing means of such a type that it senses changes in vehicle speed. Both of such inertia sensing means may also be used in combination.

Having now fully described the invention, it will be apparent to one of ordinary skill in the art that many changes and modifications can be made thereto without departing from the spirit or scope of the invention as set forth herein.

What is claimed is:

1. In an emergency lock retractor equipped with a base, a take-up spindle supported rotatably on the base and holding a take-up reel, on which a webbing is wound, fit fixedly thereon, means for biasing the take-up spindle in the webbing winding direction, and locking means actuated in the event of emergency to prevent the take-up spindle from rotating in the webbing releasing direction, the improvement wherein the locking means comprises:

(a) locking teeth arranged on the base of the retractor;
(b) an interlocking member provided between the take-up spindle and the locking teeth and displaceable between a first position where the interlocking member is out of engagement with the locking teeth and a second position where the interlocking member is brought into engagement with the locking teeth and take-up spindle so as to restrain any further rotation of the take-up spindle;
(c) a spring member engageable at one portion thereof with the take-up spindle and at another portion thereof with the interlocking member, thereby normally causing the interlocking member to rotate together with the take-up spindle and biasing the interlocking member toward the first position while holding the interlocking member out of engagement with the take-up spindle;
(d) a locking member loose-fit on the take-up spindle and rotable together with the take-up spindle and adapted to cause the interlocking member to shift from the first position to the second position, said locking member defining teeth in the circumference thereof, the teeth of said locking member being chamfered at root portions thereof; and
(e) inertia sensing means adapted to be brought into engagement with the locking member in the event of emergency so that the locking member is restrained from any further rotation and the take-up spindle is caused to rotate relative to the locking member, said inertia sensing means including a weight capable of sensing a speed change of a vehicle beyond a predetermined level and a ratchet lever adapted to transmit each motion of the weight to the locking member, thereby causing the tip of one of the teeth of the locking member to extend over the contacting surface of the ratchet lever and the tip of the ratchet lever to be received in the chamfered portion of the associated tooth when the ratchet lever is brought into contact with the tooth.

2. An emergency lock retractor as claimed in claim 1, wherein the locking member is reinforced by a skirt having a diameter greater than the contour defined by the teeth of the locking member.

3. In an emergency lock retractor equipped with a base, a take-up spindle supported rotatably on the base and holding a take-up reel, on which a webbing is wound, fit fixedly thereon, means for biasing the take-up spindle in the webbing winding direction, and locking means actuated in the event of emergency to prevent the take-up spindle from rotating in the webbing releasing direction, the improvement wherein the locking means comprises:

(a) locking teeth arranged on the base of the retractor;
(b) an interlocking member provided between the take-up spindle and the locking teeth and displaceable among a first position where the interlocking member is out of engagement with the locking teeth and take-up spindle, an intermediate position where the interlocking member is engageable with the locking teeth and take-up spindle, and a second position where the interlocking member is kept in engagement with the locking teeth and take-up spindle so as to restrain any further rotation of the take-up spindle;

(c) a spring member engageable at one portion thereof with the take-up spindle and at another portion thereof with the interlocking member, thereby normally causing the interlocking member to rotate together with the take-up spindle and holding the interlocking member at the first position;

(d) a locking member loose-fit on the take-up spindle and adapted to cause the interlocking member to shift from the first position to the intermediate position upon relative rotation of take-up spindle, said locking member defining teeth in the circumference thereof which are chamfered at root portions thereof;

(e) a flexible lever supported on the base, engageable with the locking member and permitting the displacement of the interlocking member from the intermediate position to the second position upon forced further rotation of the take-up spindle in the webbing releasing direction; and (f) a weight capable of sensing a speed change of a vehicle beyond a predetermined level so as to bring the lever to a position where the lever is engageable with the locking member;

thereby causing the tip of one of the teeth of the locking member to extend over the contacting surface of the ratchet lever and the tip of the ratchet lever to be received in the chamfered portion of the associated tooth when the ratchet lever is brought into contact with the tooth.

4. In an emergency lock retractor equipped with a base having a pair of side plates, a take-up spindle supported rotatably on the base and holding a take-up reel, on which a webbing is wound, fit fixedly thereon, means for biasing the take-up spindle in the webbing winding direction, and locking means actuated in the event of emergency to prevent the take-up spindle from rotating in the webbing releasing direction, the improvement wherein the locking means comprises:

(a) locking teeth arranged on one of the side plates of the base;

(b) a cog wheel provided fixedly on the take-up spindle at a position outside of the one of the side plates;

(c) an interlocking member loose-fit on the take-up spindle displaceably along the longitudinal axis of the take-up spindle and displaceable among a first position where the interlocking member is positioned along the longitudinal axis of the take-up spindle remote from the locking teeth, an intermediate position where the interlocking member is engageable with the cog wheel and locking teeth, and a second position where the interlocking member is brought into engagement with the locking teeth and cog wheel so as to restrain any further rotation of the take-up spindle;

(d) a spring member engageable at one portion thereof with the cog wheel and at another portion thereof with the interlocking member, thereby normally causing the interlocking member to rotate together with the take-up spindle and biasing the interlocking member toward the first position while holding the interlocking member out of engagement with the cog wheel;

(e) a locking member loose-fit on the take-up spindle at a location outside the interlocking member, said locking member defining teeth in the circumference thereof which are chamfered at root portions thereof;

(f) means adapted to engage with one of the teeth of the locking member in the event of emergency and when the take-up spindle is turned, to cause the take-up spindle to turn relative to the locking member, said means being supported on the base and including a lever engageable with one of the teeth of the locking member;

(g) cam means provided between the locking member and interlocking member and adapted to guide the interlocking member from the first position to the intermediate position when the take-up spindle is turned relative to the locking member; and (h) means permitting the displacement of the interlocking member from the intermediate position to the second position upon further forced rotation of the take-up spindle in the webbing releasing direction, thereby causing the tip of one of the teeth of the locking member to extend over the contacting surface of the ratchet lever and the tip of the ratchet lever to be received in the chamfered portion of the associated tooth when the ratchet lever is brought into contact with the tooth.

* * * * *